(12) United States Patent
Chatterjee et al.

(10) Patent No.: US 8,363,012 B2
(45) Date of Patent: Jan. 29, 2013

(54) POINTING DEVICE FOR INTERFACE WITH A GRAPHICAL DISPLAY

(75) Inventors: Monique Chatterjee, Seattle, WA (US); Jonah A. Becker, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1422 days.

(21) Appl. No.: 11/888,352

(22) Filed: Jul. 31, 2007

(65) Prior Publication Data

US 2009/0033625 A1 Feb. 5, 2009

(51) Int. Cl.
*G06F 3/033* (2006.01)
*G09G 5/08* (2006.01)

(52) U.S. Cl. .................. 345/163; 345/166
(58) Field of Classification Search .......... 345/163–166; 463/37–39; D14/402; 16/303, 308, 312
See application file for complete search history.

(56) References Cited

U.S. PATENT DOCUMENTS

| | | | | |
|---|---|---|---|---|
| 6,304,249 | B1 * | 10/2001 | Derocher et al. ............. | 345/163 |
| 6,600,479 | B1 * | 7/2003 | Smith et al. ................... | 345/163 |
| 6,633,749 | B2 | 10/2003 | Kubo et al. | |
| 6,766,180 | B2 * | 7/2004 | Doraiswamy et al. ..... | 455/575.1 |
| 7,106,301 | B2 * | 9/2006 | Smith et al. ................... | 345/163 |
| 7,111,362 | B2 | 9/2006 | Gordecki | |
| 7,209,116 | B2 | 4/2007 | Gates et al. .................. | 345/156 |
| 7,233,319 | B2 * | 6/2007 | Johnson et al. ............... | 345/166 |
| 7,239,301 | B2 | 7/2007 | Liberty et al. ................ | 345/158 |
| 7,266,399 | B2 | 9/2007 | Sawamura | |
| 7,293,813 | B2 | 11/2007 | Squyres et al. | |
| 7,324,643 | B2 | 1/2008 | Lehtonen et al. | |
| 7,353,048 | B2 | 4/2008 | Pontoppidan et al. | |
| 7,423,632 | B2 * | 9/2008 | Huang et al. .................. | 345/163 |
| 7,499,028 | B2 * | 3/2009 | Eichenberger et al. ....... | 345/163 |
| 7,557,798 | B2 * | 7/2009 | Huang et al. .................. | 345/163 |
| 7,654,459 | B2 * | 2/2010 | Orsley et al. .................. | 235/427 |
| 7,714,841 | B2 * | 5/2010 | Yen ................ | 345/163 |
| 7,724,238 | B2 * | 5/2010 | Daniel et al. .................. | 345/163 |
| 7,808,482 | B2 * | 10/2010 | Lin et al. ....................... | 345/163 |

(Continued)

FOREIGN PATENT DOCUMENTS

| | | |
|---|---|---|
| CN | 200310120635.7 | 6/2005 |
| CN | 200520057376.2 | 9/2006 |

(Continued)

OTHER PUBLICATIONS

"Computer Equipment, MoGo Mouse BT" BusinessWeek, International Design Excellence Awards, date is prior to Jul. 31, 2007; 2 pages. Chinese Application No. 200880101309.2 Second Office Action dated Apr. 18, 2012. 15 pages.
Chinese Patent Application No. 200880101309.02 Notice of First Office Action dated Aug. 17, 2011. 11 pages.

(Continued)

*Primary Examiner* — Joe H Cheng
(74) *Attorney, Agent, or Firm* — Westman, Champlin & Kelly, P.A.

(57) ABSTRACT

The application discloses a pointing device to interface with a graphical user interface of a computer or other electronic device. As disclosed the pointing device includes a contoured body profile having a forward portion and an aft or tail portion. In embodiments disclosed, the body of the pointing device includes a first body portion and a second body portion. The first and second body portions are rotationally connected via a hinge assembly to fold the device for transport and unfold the device for use. The application also discloses a pointing device having a pocket for removably holding a dongle or other device for transport or storage.

19 Claims, 5 Drawing Sheets

U.S. PATENT DOCUMENTS

| | | | |
|---|---|---|---|
| 7,817,137 B2 * | 10/2010 | Wang | 345/163 |
| 8,154,515 B2 * | 4/2012 | Chatterjee et al. | 345/163 |
| 2005/0051060 A1 | 3/2005 | Lahlou | |
| 2005/0116934 A1 * | 6/2005 | Yin et al. | 345/163 |
| 2005/0146504 A1 * | 7/2005 | Huang et al. | 345/163 |
| 2006/0278234 A1 | 12/2006 | Maatta et al. | |
| 2008/0300055 A1 * | 12/2008 | Lutnick et al. | 463/39 |
| 2010/0053084 A1 * | 3/2010 | Chatterjee et al. | 345/163 |

FOREIGN PATENT DOCUMENTS

| | | |
|---|---|---|
| JP | 8013933 A | 1/1996 |
| JP | 10-133813 | 5/1998 |
| JP | 2007-148759 | 6/2007 |
| KR | 1020010064101 Y1 | 10/1999 |
| KR | 2000-0014606 | 7/2000 |
| KR | 10-2006-0036516 | 5/2006 |

OTHER PUBLICATIONS

"Notification of Transmittal of the International Search Report and the Written Opinion of the International Searching Authority, or the Declaration" for PCT/US008/069212 filed Jul. 3, 2008; 12 pages.

International Search Report and Written Opinion for PCT Application No. PCT/US2009/052848, dated Apr. 12, 2010, 12 pages.

Notice of Grant for Chinese Patent Application No. 200990100206.4, dated Feb. 7, 2011, 4 pages.

"Fingershield Safety", retrieved at http://www.fingershieldsafety.com/products.html, Jul. 2, 2008, 2 pages.

Prosecution from U.S. Appl. No. 12/198,907, 86 pages.

Third Chinese Office Action for Chinese Application No. 200880101309.2, dated Sep. 21, 2012, 6 pages.

\* cited by examiner

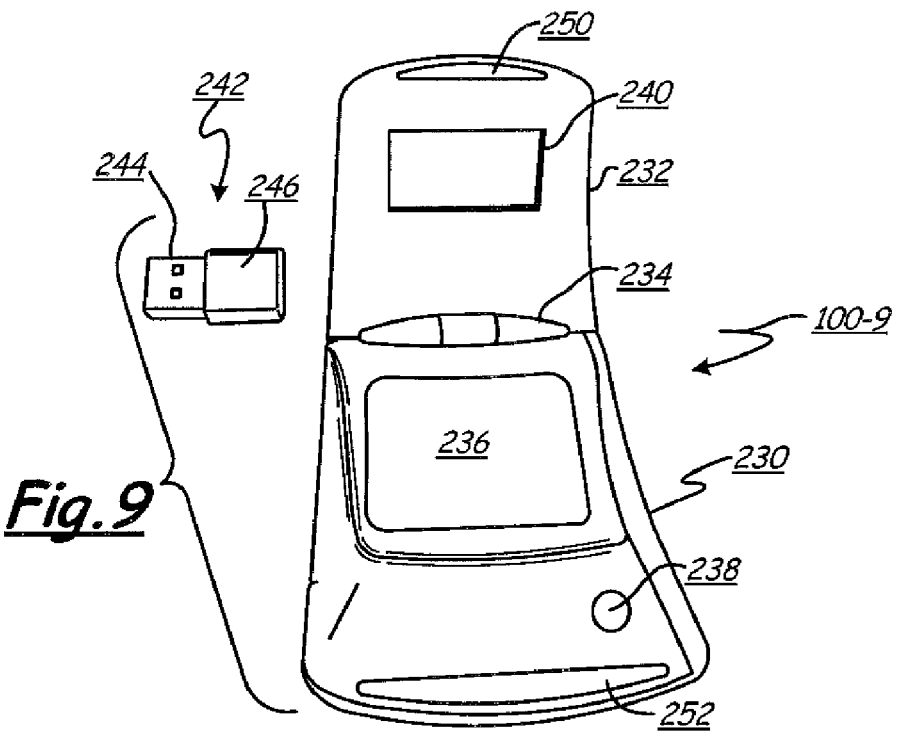
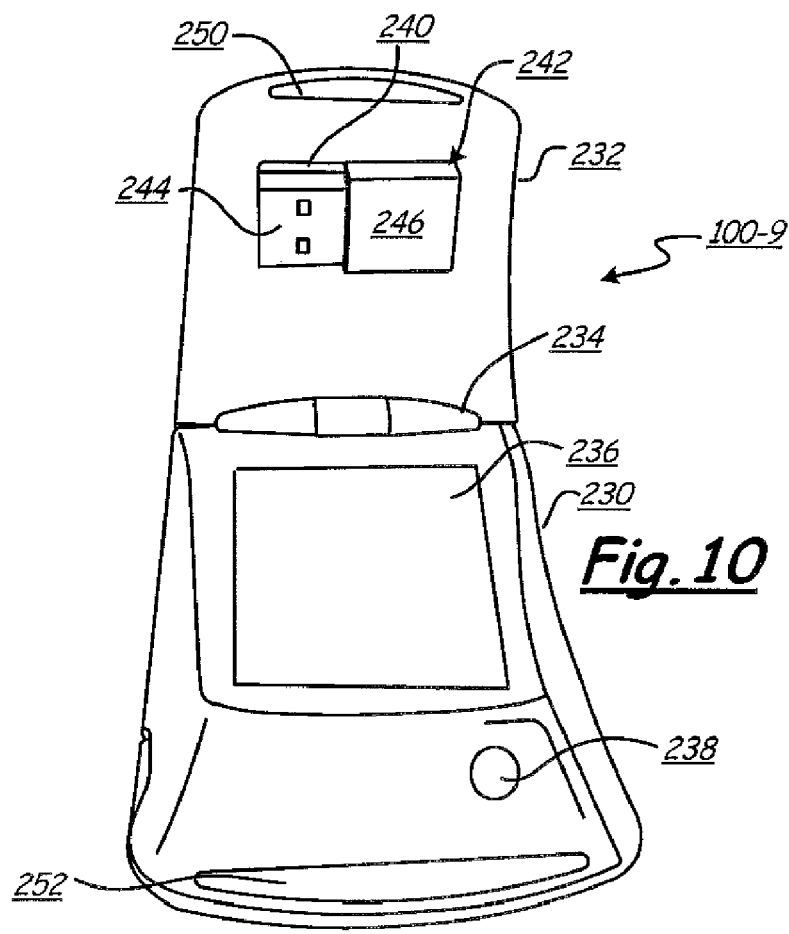

US 8,363,012 B2

POINTING DEVICE FOR INTERFACE WITH A GRAPHICAL DISPLAY

BACKGROUND

Pointing devices are used to interface with a computer or electronic device, such as a personal computer or laptop computer. The body of a pointing device is typically designed for ergonomics and comfort. Pointing devices having a larger or full sized body are typically more comfortable and easier to use than smaller sized pointing devices. Many laptop or portable computer devices, however, use smaller or miniature pointing devices that are more portable than larger or full sized devices. Although the smaller size of a pointing device enhances portability of the device, the smaller size can reduce operating ease and comfort.

The discussion above is merely provided for general background information and is not intended to be used as an aid in determining the scope of the claimed subject matter.

SUMMARY

Embodiments disclosed in the application relate to a pointing device. As disclosed the pointing device includes a contoured body profile having a forward portion and an aft or tail portion. In embodiments disclosed, the body of the pointing device includes a first body portion and a second body portion. The first and second body portions are rotationally connected via a hinge assembly to fold the device for transport and unfold the device for use. The application also discloses an embodiment of a pointing device having a pocket for removably holding a dongle or other device for transport or storage.

This Summary is provided to introduce a selection of concepts in a simplified form which are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 9-10 illustrate another embodiment of a foldable pointing device including a pocket to removably hold a dongle or other device.

DETAILED DESCRIPTION

Figure 1:
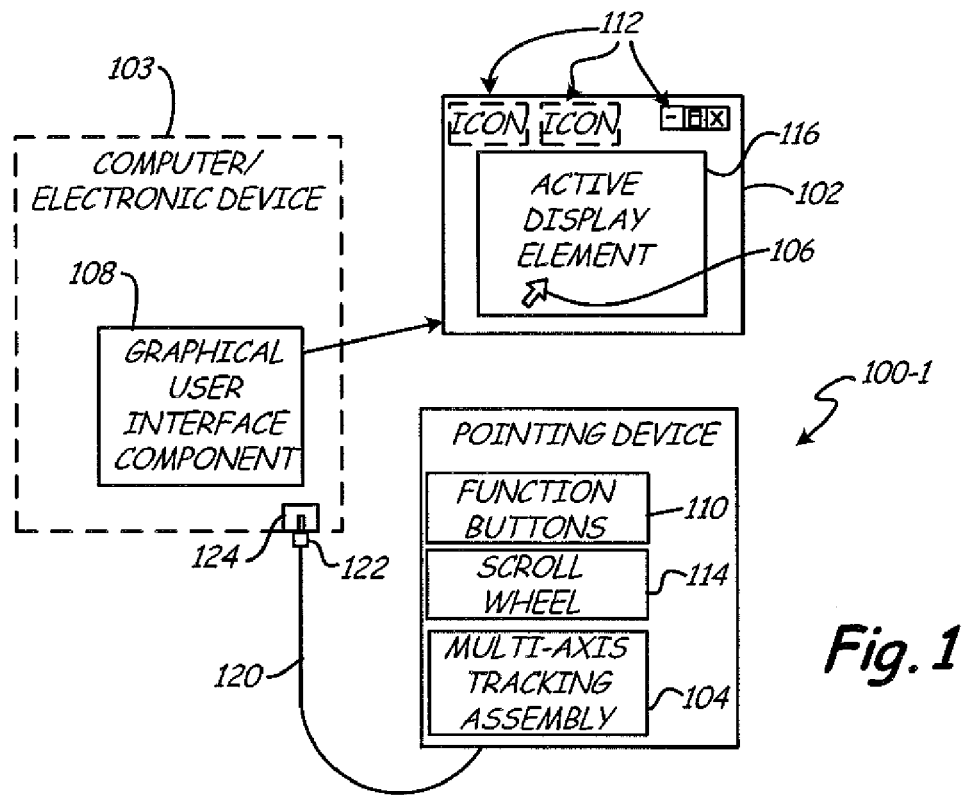
FIG. 1 is a schematic illustration of an embodiment of a pointing device and operating environment.

Pointing devices or mice allow a user to interface with applications or programs on a computer device such as a personal computer, portable computer or other electronic device having a graphical user interface. FIG. 1 schematically illustrates an embodiment of a pointing device 100-1 that is configured to interface with a graphical user interface on a graphical display 102 of a computer or other electronic device 103. In the illustrated embodiment, the pointing device 100-1 includes a tracking assembly 104, which is configured to control a position of an object on the graphical display 102. Illustratively, the object is a pointer or cursor 106 as shown in FIG. 1. Alternatively, the object is a game object for an electronic game.

The tracking assembly 104 is configured detect movement and output a control signal proportional to the detected movement. The control signal is processed by a graphical user interface component 108 to position the object or cursor or pointer 106 on the graphical display 102 in response to input from the pointing device 100-1.

In the illustrated embodiment, the tracking assembly 104 includes one or more sensor elements (not shown in FIG. 1) to detect multi-axial movement of the pointing device relative to a reference position. Illustrative sensor elements include mechanical sensor elements such as roller balls, optical sensor elements such as light-emitting diodes or photodiodes, or laser sensor elements which use an infrared laser to detect movement of the device. Application of illustrated embodiments is not limited to the particular embodiment shown in FIG. 1, nor to the particular sensor elements described.

As shown in FIG. 1, in the illustrated embodiment, the pointing device 100-1 includes one or more function buttons 110 to select or activate various functions or features on the graphical display 102. The functions or features are selected through icons or input 112 of the graphical user interface. Functions are activated or selected by positioning the pointer or cursor 106 relative to the particular icon or input 112 corresponding to the desired function or feature.

Once the pointer or cursor 106 is positioned on the desired icon or input 112, the user depresses the button 110 to activate the function corresponding to the particular icon or input 112 selected. Upon activation of the one or more buttons 110, the device outputs a control signal, which is processed by the graphical user interface component 108 to activate or invoke the selected application function or feature.

The illustrated device also includes a scroll wheel 114. The scroll wheel 114 is rotatable about a single axis to provide a one-dimensional input, which illustratively is used to scroll through an active display element 116 of the graphical display 102. Illustrative display elements 116 include, but are not limited to, text documents, HTML documents or Web pages. Although FIG. 1 illustrates a particular configuration for a pointing device, application is not limited to a pointing device including each of the buttons or components illustrated in FIG. 1.

In an illustrated embodiment, the pointing device communicates with the graphical user interface component 108 through a cable 120 connected to or hard wired to circuitry of the pointing device 100-1. The cable 120 is connected to the computer or electronic device 103 via a connector plug 122 (illustrated schematically) insertable into a connector port 124 on the computer device. Although a cable connection is illustrated in FIG. 1, application is not limited to a pointing device coupled to the computer device 103 via a cable connection.

Figure 2:
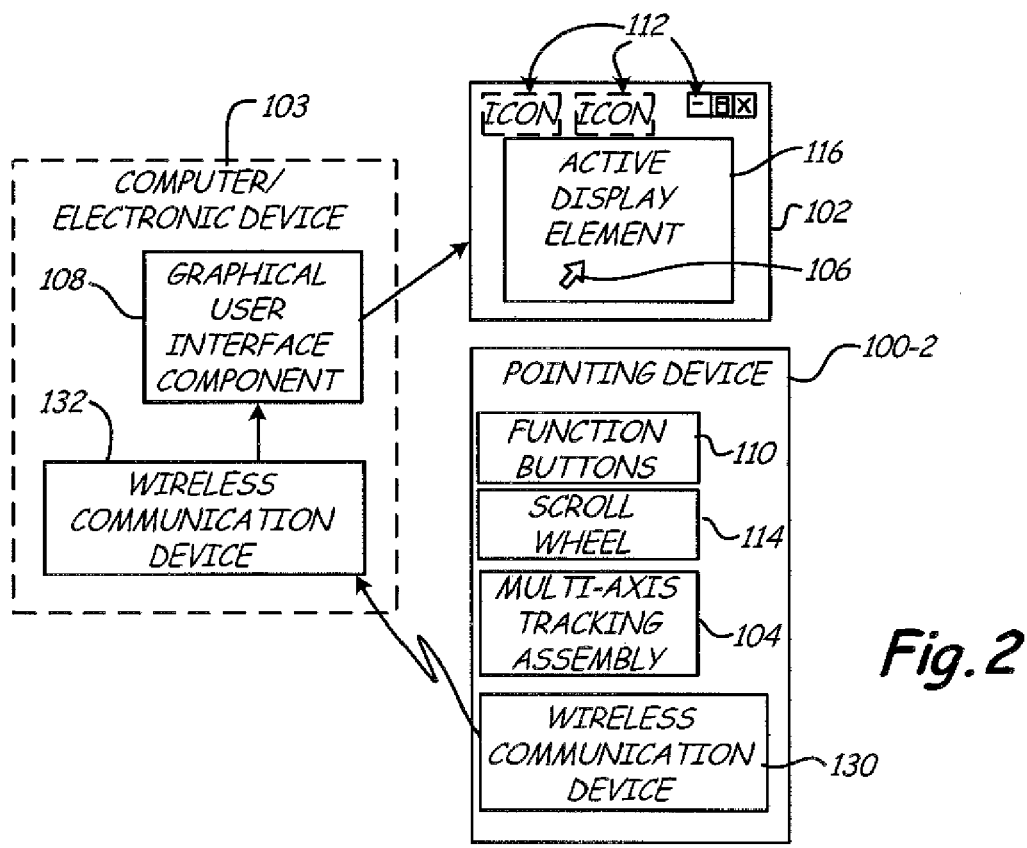
FIG. 2 is a schematic illustration of an embodiment of a wireless pointing device and operating environment.

For example, in an alternate embodiment shown in FIG. 2, the pointing device 100-2 communicates with the computer or electronic device 103 through a wireless interface. The wireless interface includes a wireless communication device 130 coupled or connected to the pointer device 100-2 and a wireless communication device 132 coupled to the computer device 103. Output from the pointing device 100-2 is transmitted via the wireless communication device 130 to the wireless communication device 132 on the computer device 103 via known communication protocols. Illustratively the wireless communication device can utilize a RF communication protocol or other communication protocols. The transmitted output is processed by the graphical user interface component 108 to provide a user interface through the graphical display 102.

Figure 3:
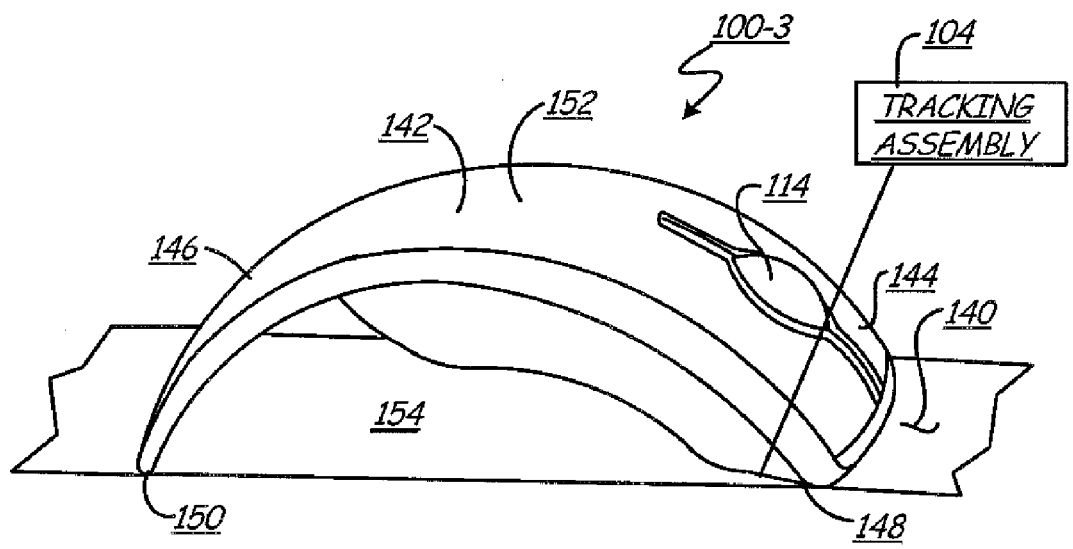
FIG. 3 is an embodiment of a pointing device having an arched body contour.

FIG. 3 illustrates an embodiment of a pointing device 100-3, which is moved along an operating surface 140 to control the position of the cursor or pointer 106 or other object on the graphical display 102 as previously described. In the embodiment shown, the device has an arched contoured body 142 to grip the pointing device to move the pointing device 100-3 along the operating surface 140. In the embodiment shown, movement of the pointing device is detected by the tracking assembly 104 and processed by the graphical user interface component 108 to position the cursor or pointer 106 or other object in response to the detected movement. Although in the illustrated embodiment, the pointing device 100-3 is moved to control the position of the cursor or pointer 106, application of the illustrated embodiments described herein is not necessarily limited to movement of the pointing device for controlling the position of the cursor or pointer 106.

As shown in FIG. 3, the contoured body 142 of the pointing device 100-3 includes a forward or head portion 144 and an aft tail portion 146. The forward portion 144 includes a forward contact surface 148 and the aft or tail portion 146 includes an aft contact surface 150. As shown, the arched contoured body 142 provides an arced portion 152 between the forward portion 144 and the aft or tail portion 146. The arched portion 152 is elevated from the forward and aft contact surfaces 148, 150 to form void region 154. The void region 154 provides a space for the user to grip an underside of the body of the pointing device to lift and/or position the pointing device.

During use, the user's palm is supported on a surface of the tail portion 146 and the user's fingers are positioned proximate to the forward or head portion 144 of the pointing device. As shown schematically, in the illustrated embodiment, the tracking assembly 104 is located proximate the forward contact surface 148 of the pointing device to detect movement to control the position of the cursor or pointer 106 on the graphical display 102.

Pointing devices having a larger size provide more space between the forward and aft portions of the body so that a user has sufficient space to comfortably support their hand. In the illustrated embodiment, the void region 154 formed by the arched contour of the body provides a space for the user to grip the device for ergonomic comfort and ease of use. The arched contour also reduces the mass or weight of the device while providing sufficient length and size for desired ergonomic performance. In the illustrated embodiment, the pointing device 100-3 includes scroll wheel 114 to scroll through an active display element 116 as previously described in FIGS. 1-2. Operating component of the device 100-3 including component of the tracking assembly 104 and scroll wheel 114 are contained in an interior compartment or compartments within the body 142 of the device. Additionally in illustrative embodiments, the device includes one or more buttons 110 or other input keys to interface with the graphical display 102 generated by the graphical user interface component 108 or other functions of the electronic device.

As shown, the arched contour of the body allows a user to drape the device over the user's hand, lean back and scroll or flip through content on the graphical display 102. In particular, the void region 154 forms a negative space so that user can pick up the device and operate the device, away from the operating surface 140 or desktop. For example, the user can grip the device to operate one or more buttons or scroll wheel using the user's thumb.

Figure 4:
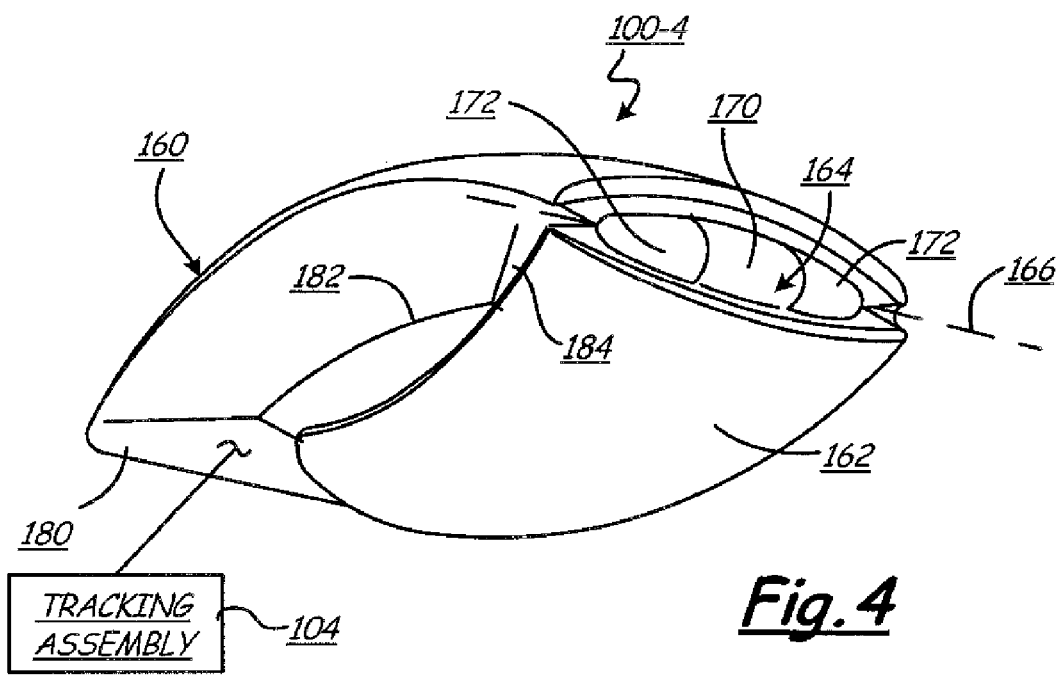
FIG. 4 is an embodiment of a foldable pointing device having a plurality of rotationally connected body portions.

FIG. 4 illustrates an embodiment of a pointing device 100-4, which is folded for portability and expanded to provide a desired size or footprint for ergonomic performance. As shown, the illustrated pointing device 100-4 includes a first body portion 160, a second body portion 162 and a hinge assembly 164 pivotally connecting the first and second body portions 160, 162. As shown, the hinge assembly 164 allows for rotation about the hinge axis 166 to fold the device in a collapsed profile shown in FIG. 4 and unfold the device to provide an extended or full size profile as generally shown in FIG. 3.

In the illustrated embodiment, the hinge assembly 164 includes a rotating hinge element 170 and stationary hinge elements 176, although application is not limited to the particular hinge assembly shown. The rotating hinge element 170 rotates relative to the stationary hinge elements 172 to unfold or expand the device for use. In an illustrated embodiment, the rotating hinge element 170 rotates along an arcuate path approximately 180 degrees to unfold the first and second body portions 160, 162 to form a full or expanded size device. Following use the user can collapse the device by rotating the hinge assembly 164 to provide a smaller profile and size for transport.

In the embodiment illustrated in FIG. 4, the first and second body portions 160, 162 are contoured to form forward and aft portions having forward and aft contact surfaces and an arched portion as previously described with respect to FIG. 3. In particular, in the particular embodiment shown, the first body portion 160 is contoured to form a sloped or angled tip surface 180, an intermediate surface 182 and rear surface 184 that is angled inward towards the hinge assembly 164. The forward contact surface is formed proximate to the angled tip surface 180. In an illustrated embodiment, sensor elements (not shown in FIG. 4) of the tracking assembly 104 are located proximate to the angled tip surface 180 to provide input for detecting movement as previously described.

Figure 5:
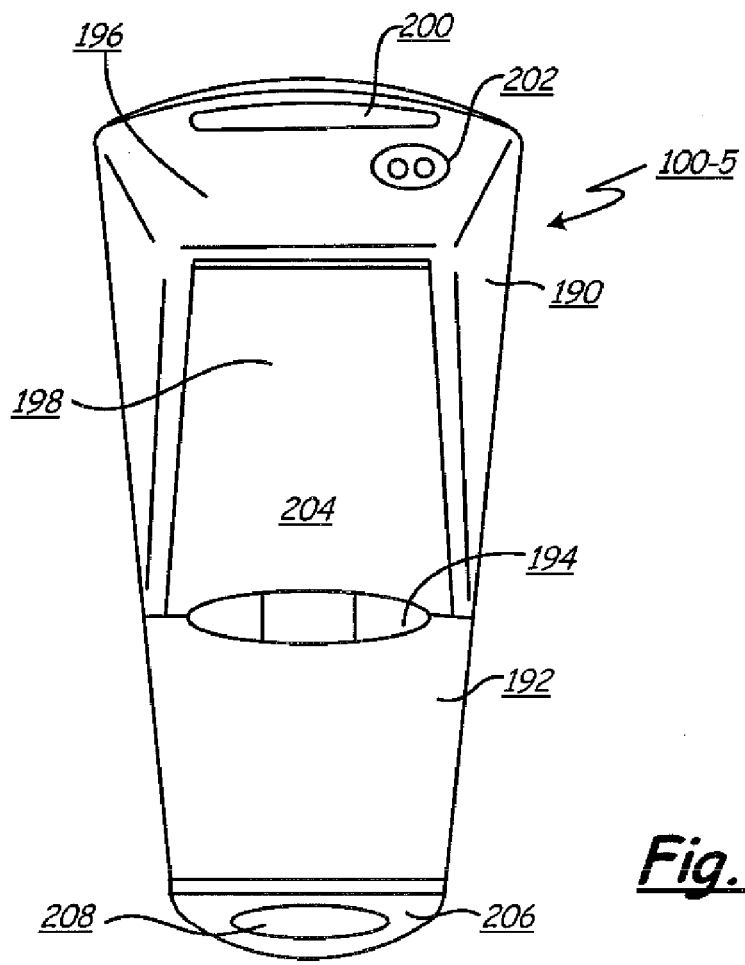
FIG. 5 illustrates an embodiment of a foldable pointing device having an expanded or extended profile.

FIG. 5 illustrates an alternate embodiment of a foldable pointing device 100-5 including first and second body portions 190, 192 and a hinge assembly 194 similar to FIG. 4. In the illustrated embodiment, the first body portion 190 includes a sloped tip surface 196 and sloped rear surface 198 as shown. The sloped tip surface 196 includes an elongate foot 200, which forms the forward contact surface for the device. The foot 200 is attached to the body of the device. The foot 200 is formed of a material that has a relatively low friction coefficient relative to the operating surface 140 to allow the device to move or slide along the operating surface 140 as will be appreciated by those skilled in the art.

The sloped tip surface 196 also includes an opening 202 for sensor elements of the tracking assembly 104 to detect movement. The sloped rear surface 198 includes a door panel 204, which is connected to the body of the device to provide access to a battery compartment of a wireless device or other interior compartment. The second body portion 192 forms the aft tail portion and includes a raised end surface 206 having an elongate foot 208 that forms the rear contact surface of the device.

Figure 6:
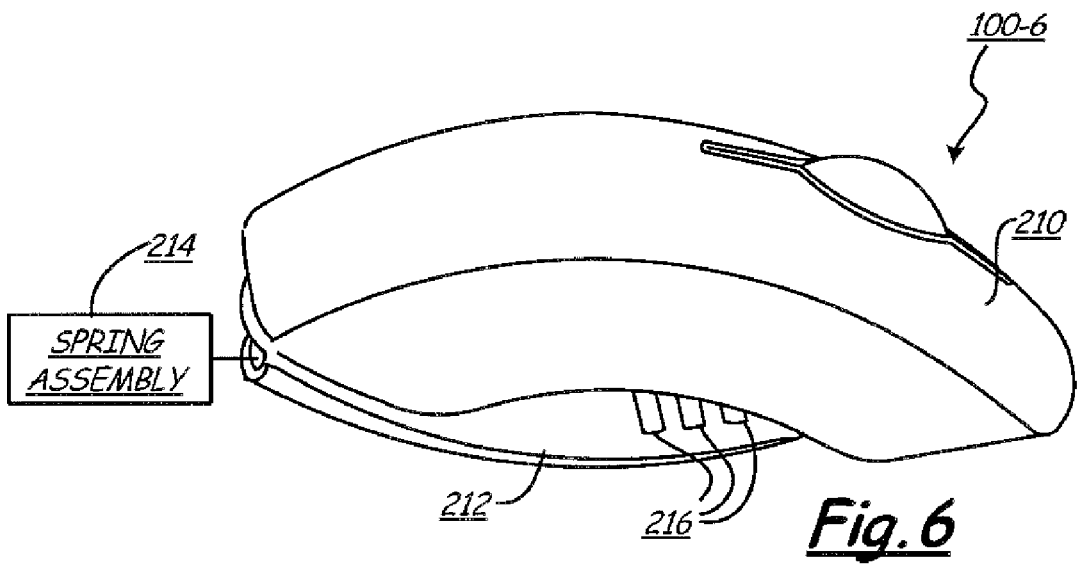
FIG. 6 is an embodiment of a foldable pointing device configured to form a clip.

FIG. 6 illustrates an embodiment of a foldable pointing device 100-6, which is configured to clip to a portable computer, bag, briefcase or other item for transport. The device 100-6 includes a first body portion 210, a second body portion 212 and hinge assembly (not shown in FIG. 6) connecting the first and second body portions 210, 212 to form the forward and aft portions of the device. In the illustrated embodiment, the device 100-6 also includes a spring assembly 214 or other device to bias the tail or second body portion 212 in the folded position to clip the device to a portable computer or other item for transport.

Additionally, the tail portion 212 includes a plurality of ribs 216 to provide a gripping surface for clipping the device to an item. The ribs 216 are formed of an elastomeric material or other material that provides sufficiently high friction to grip the item or device to which the pointing device is clipped. Although FIG. 6 includes a spring assembly 214, other devices can be utilized to bias the first and second body portions 210, 212 in a closed clipped position.

Figure 7:
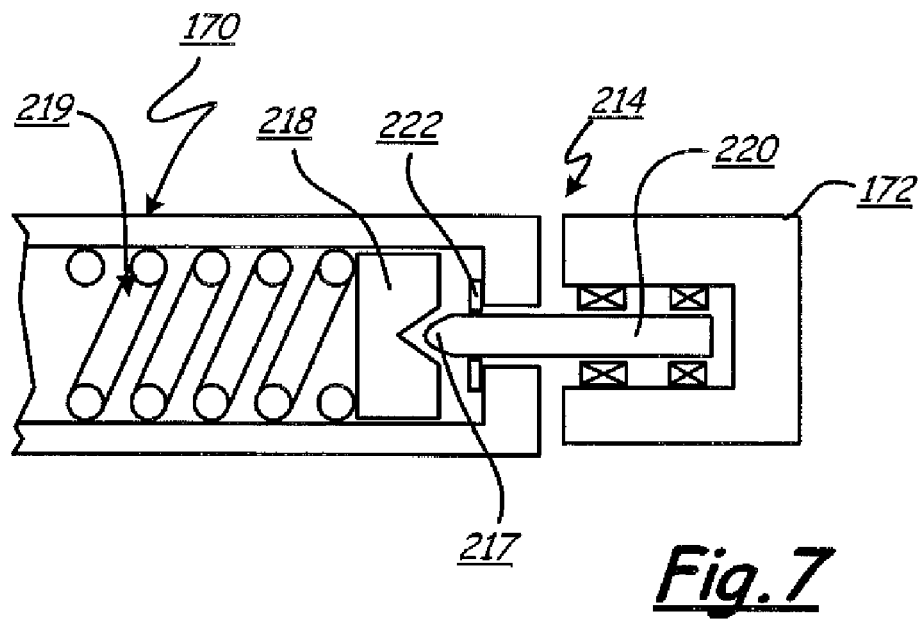
FIG. 7 illustrates an embodiment of a hinge assembly including a camming assembly.

FIG. 7 illustrates an embodiment of a spring assembly 214 to bias a hinge assembly in a clipped or closed position. In the illustrated embodiment, the spring assembly 214 includes a camming assembly including camming block 218 and spring 219 disposed in the rotating hinge element 170. As shown, the camming block 218 interfaces with a cam follower 217 coupled to a spindle rod 220 rotatable within the stationary hinge element 172.

The camming block 218 is contoured to impart a rotational force to the spindle rod 220 via the cam follower 217 to rotate the rotating hinge element 170 relative to the stationary hinge element 172. The camming block 218 is biased toward the cam follower 217 via spring 219. Longitudinal movement of the spindle rod 220 is restricted via plate 222. The camming block 218 includes at least one camming surface that imparts a rotational force or torque to the spindle rod 220 via spring 219 to bias the hinge assembly in a folded position to form the clip.

Figure 8:
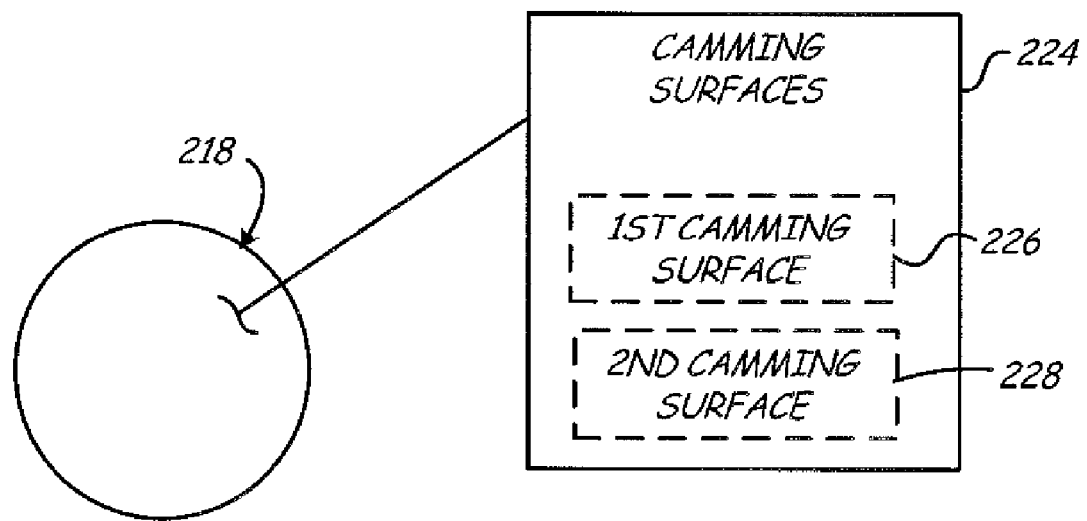
FIG. 8 illustrates an embodiment of camming block including a plurality of camming surfaces.

In an illustrated embodiment shown in FIG. 8, the camming block 218 of the camming assembly includes a plurality of camming surfaces 224 to impart different torque or rotation to the spindle rod 220. In particular, in the illustrated embodiment, the camming block 218 includes a first camming surface 226 to provide a first rotation force or torque and a second camming surface 228 to provide a second rotation force or torque. The camming surfaces 226, 228 are orientated so that the body portions of the device rotate slowly at first and after a certain point snap shut.

For example, in an illustrated embodiment, the first camming surface 226 controls rotation along a 0-130 degree arcuate path. The second camming surface 228 controls rotation along a 130-180 degree arc so that the pointing device snaps shut when the tail or second body portion reaches a certain position along the arcuate path. Although a particular example is provided, application is not limited to the particular example described or to a camming assembly including a plurality of camming surfaces as disclosed.

As previously described, embodiments of the pointing device can interface with the graphical user interface component 108 of computer device via a cable or other wired connection. The wired device is powered from the power source of computer or electronic device 103 through the cable or wire connection. As previously described, in an alternate embodiment, the device communicates through a wireless interface. Typically, wireless pointing devices are powered by one or more batteries, which are disposed in a battery compartment of the device.

FIGS. 9-10 illustrate an embodiment of a pointing device 100-9, which provides input to a graphical user interface component 108 through a wireless interface. As shown, the pointing device 100-9 includes a first body portion 230, a second body portion 232 and a hinge assembly 234 rotationally connecting the first body portion 230 to the second body portion 232. The first body portion 230 forms the forward or head portion and the second body portion 232 forms the tail portion of the device. In the illustrated embodiment, the first body portion 230 includes a door or panel 236 to access a battery compartment (not shown). The first body portion 230 also includes an opening 238 for sensor elements of tracking assembly 104 as previously described.

In the illustrated embodiment, the pointing device 100-9 also includes a recessed pocket 240 sized to removably hold a dongle or other device 242. In the illustrated embodiment, the pocket 240 is formed in the tail portion. The dongle or other device 242 includes a universal serial bus "USB" port connector plug 244 and a wireless communication device 246 that is configured to receive input signals from the pointing device 100-9.

For use, the connector plug 244 plugs into a USB or other communication port of the computing device to interface with the graphical user interface component 108. Control signals from the pointing device 100-9 are transmitted through the wireless communication device or transmitter on the pointing device to the wireless communication device 246 of the dongle or other device 242. The control signals received by the wireless communication device 246 of the dongle or other device 242 are processed by the graphical user interface component 108 to interface with a graphical user interface on a graphical display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pointing device comprising:
   a first body portion;
   a second body portion;
   a hinge assembly rotationally connecting the first body portion and the second body portion, the first and second body portions being rotatable about a hinge axis to form an extended profile having a head portion and a tail portion and a collapsed profile where the first and second body portions are folded relative to the hinge axis;
   a spring assembly configured to bias the hinge assembly towards a folded position, the spring assembly configured to provide a first rotational force at a first rotational position of the second body portion that is greater than a second rotational force at a second rotational position of the second body portion; and
   a tracking assembly including at least one sensor to detect movement and output a control signal responsive to the detected movement.

2. The pointing device of claim 1 wherein tracking assembly detects movement of the pointing device with respect to a surface on which the pointing device is positioned and outputs the control signal based on the movement.

3. The pointing device of claim 1 wherein the spring assembly includes a camming surface to bias the hinge assembly towards the folded position.

4. The pointing device of claim 3 wherein the spring assembly includes a plurality of camming surfaces including a first camming surface providing the first rotation force and a second camming surface providing the second rotation force to snap shut the first and second body portions in a shut position.

5. The pointing device of claim 1 wherein the second body portion includes a plurality of spaced ribs.

6. The pointing device of claim 5 wherein the plurality of ribs are formed of an elastomeric material.

7. The pointing device of claim 1 wherein the first body portion forms a head or forward portion and the second body portion forms a tail portion and the tracking assembly is disposed on the forward portion.

8. The pointing device of claim 1 and further comprising at least one button or scroll wheel.

9. A pointing device comprising:
    a body comprising:
        first and second body portions configured to be positioned on and movable relative to a surface, the first body portion having a forward contact surface and the second body portion having a rear contact surface, the forward and rear contact surfaces configured to contact the surface and define a bottom surface plane of the body;
        an arched contour formed on the first body portion between the forward and rear contact surfaces forming a void region or area between the bottom surface plane of the body and the arched contour; and
        a hinge assembly rotationally connecting the first body portion and the second body portion, the first and second body portions being rotatable about a hinge axis to form an extended profile where the forward and rear contact surfaces are configured to contact the surface and a collapsed profile where the second body portion is at least partially received within the void region formed by the arched contour of the first body portion; and
    a tracking assembly including at least one sensor configured to detect movement of the body relative to the surface and output a control signal responsive to the detected movement.

10. The pointing device of claim 9 wherein the body includes a first body portion and a second body portion and a hinge assembly pivotally connecting the first and second body portions.

11. The pointing device of claim 9 wherein body of the device includes a sloped or angled surface proximate to a forward region and the device includes an opening proximate to the sloped or angled surface for the tracking assembly.

12. The pointing device of claim 9 and further comprising at least one button or scroll wheel.

13. A pointing device comprising:
    a body comprising:
        a first body portion;
        a second body portion;
        a hinge assembly rotationally connecting the first body portion and the second body portion; and
        a bottom surface configured to be positioned on and movable relative to a surface, the body having a pocket accessible through an opening formed on the bottom surface, the pocket sized to removably hold a dongle or other device inserted into the pocket through the opening; and
    a tracking assembly including at least one sensor configured to detect movement of the body relative to the surface and output a control signal responsive to the detected movement.

14. The pointing device of claim 13 wherein the first body portion forms a head or forward portion and the second body portion forms a tail portion and the pocket is formed in the tail portion.

15. The pointing device of claim 13 wherein the dongle comprises a wireless communication device and a connector plug.

16. The pointing device of claim 15 wherein the connector plug is insertable into a universal serial bus (USB) port of a computing device.

17. The pointing device of claim 13 and further comprising a spring assembly coupled to the hinge assembly to bias the first and second body portions in a folded position.

18. The pointing device of claim 13, wherein the opening is formed in the first body portion, and wherein the first and second body portions are rotatable about a hinge axis to form an extended profile and a collapsed profile in which the second body portion covers the opening formed on the bottom surface of the first body portion.

19. The pointing device of claim 18, wherein the extended profile permits removal of the dongle or other device through the opening and the collapsed profile prevents removal of the dongle or other device through the opening.

* * * * *